(12) United States Patent
Gemmeke et al.

(10) Patent No.: US 8,860,502 B2
(45) Date of Patent: Oct. 14, 2014

(54) METHOD AND APPARATUS FOR MONITORING TIMING OF CRITICAL PATHS

(71) Applicant: Stichting IMEC Nederland, Eindhoven (NL)

(72) Inventors: Tobias Gemmeke, Leuven (BE); Mario Konijnenburg, Leuven (BE)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 13/891,736

(22) Filed: May 10, 2013

(65) Prior Publication Data
US 2013/0300463 A1    Nov. 14, 2013

(30) Foreign Application Priority Data

May 11, 2012   (EP) .................................... 12167647

(51) Int. Cl.
*G06F 1/10*    (2006.01)
*G06F 3/02*    (2006.01)
*G06F 1/32*    (2006.01)
*G06F 17/50*   (2006.01)

(52) U.S. Cl.
CPC ............ *G06F 17/5031* (2013.01); *G06F 1/324* (2013.01); *G06F 17/505* (2013.01); *G06F 1/3296* (2013.01); *G06F 2217/84* (2013.01)
USPC ........... 327/538; 327/113; 327/378; 327/525; 327/544; 327/545; 716/108; 716/112

(58) Field of Classification Search
CPC ............. G06F 17/5031; G06F 17/505; G06F 17/5081; G06F 1/324; G06F 1/3296
USPC ................. 327/113, 378, 525, 538, 544, 545; 716/108, 112
See application file for complete search history.

(56) References Cited

U.S. PATENT DOCUMENTS

2005/0251700 A1   11/2005   Henderson et al.
2008/0104561 A1    5/2008   Carpenter et al.
(Continued)

FOREIGN PATENT DOCUMENTS

EP              2006784 A1    12/2008

OTHER PUBLICATIONS

Ernst, D. et al., "Razor: A Low-Power Pipeline Based on Circuit-Level Timing Speculation", Proceedings of the 36th International Symposium on Microarchitecture (MICRO-36), Dec. 2003, pp. 7-18.

(Continued)

*Primary Examiner* — John Poos
(74) *Attorney, Agent, or Firm* — McDonnell Boehnen Hulbert & Berghoff LLP (57) ABSTRACT

An apparatus for monitoring timing of a plurality of critical paths of a functional circuit includes a plurality of canary circuits, each configured to be coupled to a critical path of a functional circuit for detecting and outputting critical timing events. Each canary circuit includes an adjustable delay element and an analyzer circuit for receiving a count of the critical timing event output from at least one of the plurality of canary circuits for a predetermined time interval for a plurality of delay values of the adjustable delay elements and for determining a probability distribution of critical timing events of the at least one of the plurality of critical paths for the predetermined time interval for the plurality of delay values.

15 Claims, 8 Drawing Sheets

(56) References Cited

U.S. PATENT DOCUMENTS

2009/0031268 A1     1/2009    Miranda et al.
2009/0206904 A1*   8/2009    Shimura ..................... 327/199

OTHER PUBLICATIONS

Nakai, M. et al., "Dynamic Voltage and Frequency Management for a Low-Power Embedded Microprocessor," IEEE Journal of Solid-State Circuits, vol. 40, No. 1, Jan. 2005, pp. 28-35.

Blaauw, D. et al., "Razor II: In Situ Error Detection and Correction for PVT and SER Tolerance," ISSCC Dig. Tech. Papers, Session 22, Variation Compensation & Measurement, 22.1, Feb. 2008, pp. 400-401 and 622.

European Search Report, European Patent Application No. 12167647.2 dated Oct. 29, 2012.

Fuketa, Hiroshi et al., "Trade-off Analysis Between Timing Error Rate and Power Dissipation for Adaptive Speed Control With Timing Error Prediction", Design Automation Conference, Jan. 19, 2009, pp. 266-271.

Wirnshofer, Martin et al., "A Variation-Aware Adaptive Voltage Scaling Technique Based on In-Situ Delay Monitoring", Design and Diagnostics of Electronic Circuit & Systems, 2011 IEEE 14th International Symposium, Apr. 13, 2011, pp. 261-266.

Fuketa, Hiroshi et al., "Adaptive Performance Compensation With In-Situ Timing Error Prediction for Subthreshold Circuits", IEEE 2009 Custom Integrated Circuits Conference (CICC), Sep. 13-16, 2009, pp. 215-218.

Hashimoto, Masanori, "Run-Time Adaptive Performance Compensation Using On-Chip Sensors", Design Automation Conference (AAP-DAC), 2011 16th Asia and South Pacific, Jan. 25-28, 2011, pp. 285-290.

Hashimoto, Masanori, "Adaptive Performance Compensation Using On-Chip Variation Monitoring", Circuit and Systems (MWSCAS), 2011 IEEE 54th International Midwest Symposium, Aug. 7-10, 2011, pp. 1-4.

Shah, Nimay et al., "Built-In Proactive Tuning System for Circuit Aging Resilience", IEEE International Symposium on Defect and Fault Tolerance of VLSI Systems, 2008, pp. 96-104.

Das, Shidhartha et al., "Adaptive Design for Nanometer Technology", Circuits and Systems, 2009, ISCAS 2009, IEEE International Symposium, May 24-27, 2009, pp. 77-80.

Kehl, Ted, "Hardware Self-Tuning and Circuit Performance Monitoring", Computer Design: VLSI in Computers and Processors, 1993, ICCD '93, 1993 IEEE International Conference, Oct. 3-6, 1993, pp. 188-192.

Wang, Jiajing et al., "An Enhanced Canary-Based System With BIST for SRAM Standby Power Reduction", IEEE Transactions on Very Large Scale Integration (VLSI) Systems, vol. 19, No. 5, May 2011, pp. 909-914.

* cited by examiner

METHOD AND APPARATUS FOR MONITORING TIMING OF CRITICAL PATHS

CROSS-REFERENCE TO RELATED APPLICATION

This application claims priority to European Patent Application No. 12167647.2 filed on May 11, 2012, the contents of which are hereby incorporated by reference

FIELD OF THE DISCLOSURE

The present disclosure relates to an apparatus for monitoring timing of a plurality of critical paths to detect any critical timing events and adjust dynamically voltage and/or frequency to avoid violations.

BACKGROUND TO THE DISCLOSURE

Enabling systems to run at multiple frequency and voltage levels is a challenging process and requires characterization of the processor to ensure its correct operation at the required operating points. This means ensuring correct process operation with respect to a number of environmental and process related variabilities, such as unexpected voltage drops in the power supply network, temperature fluctuations, gate-length and doping concentration variations, etc. A minimum possible supply voltage for given maximum operating clock frequency, referred to as the critical supply voltage, must ensure correct processor operation of the design when accounting for these variabilities. These variabilities may be data dependent and are composed of local and global components. For instance, local process variations will impact specific regions of the die in different and independent ways, while global process variation impacts the circuit performance of the entire die and creates variation from one die to the next. Similarly, temperature and supply drop have local and global components, while cross-coupling noise is a predominantly local effect.

With the technology scaling, the local component of environmental and process variation is becoming more and more prominent and the sensitivity of circuit performance to these variations is even higher at lower operating voltages. For example, variation in circuit speed increases significantly. Increases in delay variations may occur due to variations of distances between logic gates (assuming gates are locally more correlated, i.e. spatially correlated). Similarly, random variations in timing become more and more dominant.

Assuring correct operation of a design translates to assuring correct operation of its timing critical paths. A timing critical path is, for example the longest path between (i) an input and a first sequential element, (ii) two sequential elements (between two clocked flip-flops) or (iii) a sequential element and an output, and is characterized with the smallest path slack, which is the difference between the maximal propagation delay and the clock period. The timing critical path defines the maximum operating clock frequency. For example, if the frequency is too high (i.e. the logic between the two sequential elements is too slow for the given frequency) the data signal will arrive too late on the input of the next (also referred as receiving) sequential element to be captured properly resulting in erroneous operation. This problem is called a setup timing violation.

Any design of a plurality of circuits or circuit blocks (or chips) has timing critical paths. Even when designed to meet (easily) the timing requirements, these paths will fail first, for example, when the design is in a (very) slow process corner or when dynamic frequency and voltage scaling is applied (DVFS). As modern technologies (such as 40 nm and below) designs suffer from high process variability, which are worsened when operating at reduced supply voltages, for marginal voltage-frequency combinations some chips will work, others (with slower devices) will not. What is more, due to within-die variations, the first failing path will differ from die to die.

To guarantee a correct operation of a digital design, a timing closure analysis is performed which adds a certain margin to the minimal supply voltage and/or the maximal frequency to account for variations in the timing behaviour of the fabricated circuits and for effects not covered in the timing closure analysis. These can be due to intra- or inter-die process-voltage-temperature (PVT) variations, e.g., supply voltage drops which may also very over time, temperature fluctuations and ageing. Thus, traditional DVS techniques, for example, as disclosed by M. Nakai et al., "Dynamic Voltage and Frequency Management for a Low-Power Embedded Microprocessor," IEEE J. Solid-State Circuits, vol. 40, no. 1, January 2005, use canary circuits to mimic the critical path delay of the actual design. However, the canary circuits require significant voltage safety margins (adding up to 50% of the total energy budget) to guarantee computational correctness at the worst case combination of intra-die process variations, and local fluctuations in voltage and temperature, leading to a loss in energy efficiency. Further, they also have difficulty responding to rapidly changing conditions. However, these approaches cannot compensate for mismatches in tracking across PVT between the actual critical path and the modelled paths, die variations between location of monitor path and critical path, random variations between monitor path and critical path, response times of monitor circuit on fast changing conditions, aging (at different rate), and therefore require additional safety margins to the critical voltage.

Razor-based DVS techniques have been proposed, for example D. Ernst et al., "Razor: A Low-Power Pipeline Based on Circuit-Level Timing Speculation", MICRO-36, December 2003, pp. 7-18, based on dynamic detection and correction of circuits timing errors. It proposes the usage of an error detection and correction mechanism to eliminate the safety margins due to intra-die and local PVT variations while tolerating a limited number of errors. These techniques allow reducing automatically the supply voltage to the point of first failure (PoFF). However, this technique does not offer a good trade-off between the overhead due to re-computation and saved energy. Thus, only a small amount of failures are tolerated. Further, since the error correction hardware is part of the circuitry (sequential elements), its area and power footprint is increased.

Razor II has the main advantage of reducing the overhead for recomputing by reusing hardware already available in common processors (e.g. wrong prediction). These shortcomings are partly solved by the new Razor approach as disclosed by D. Blaauw et al., "Razor II: In Situ Error Detection and Correction for PVT and SER Tolerance," ISSCC Dig. Tech. Papers, pp. 400-1, February 2008, by detecting failures of the actual circuit and triggering re-computation. This allows lowering of the supply voltage and/or frequency to the PoFF (or even up to a failure rate of 0.1% of all computed results) which eliminates the safety margins. However, this approach has proved to be problematic in observing all potentially functional failing flops.

In more recent work, patent application US 2009/0031268 A1 proposes an in-situ canary circuit—a combination of classical Critical Path Monitors and the in-situ Razor approach. Here, the sequential elements of the most timing critical paths are duplicated (canary circuits). The duplicates have an increased delay on the data, thereby making it more timing critical. Similarly to the Razor approach, the in-situ canary circuits observe the actual timing critical path; it exactly tracks across PVT. However, the tracking of random variation is limited to the duplicated storage elements. It still has to preserve some margin, for extreme cycle-to-cycle timing variations due to changes in the actual data processing.

In another example, Martin Wirnshofer et al: "A variation-aware adaptive voltage scaling technique based on in-situ delay monitoring" DESIGN AND DIAGNOSTICS OF ELECTRONIC CIRCUITS & SYSTEMS (DD ECS), 2011 IEEE 14$^{TH}$ INTERNATIONAL SYMPOSIUM ON, IEEE, 13 Apr. 2011, discloses an adaptive voltage scaling (AVS) scheme in combination with in-situ delay monitoring. The AVS scheme reduces the supply voltage as long as there are no critical timing events observed during an observation interval. It can be assumed that the voltage is scaled based on a scenario A. In the next observation interval, the system runs in a second scenario B in which the critical timing path is longer than that in scenario A. In this case, the voltage level will be insufficient to support error free operation in scenario B. The system remains at the voltage level of scenario A, generating multiple errors until a signalling threshold is reached (critical timing event occurs) that leads to a correction in supply voltage. Since, scaling down of the voltage is based on the first signalling event only, this approach is prone to errors, and for signalling rates in the order of seconds, this approach would be unsuitable for dynamic tracking.

SUMMARY OF DISCLOSURE

The present disclosure seeks to provide a more reliable technique of detecting and preventing functional failures in a digital design in modern technologies operating at low power, more specifically, providing automated integration and dynamic tracking of variations such as, for example, process, voltage and temperature variations whilst mitigating the drawbacks of existing systems.

This is achieved, according to one aspect of the present disclosure, by an apparatus for monitoring timing of a plurality of critical paths of a functional circuit. The apparatus includes a plurality of canary circuits, each configured to be coupled to a critical path of a functional circuit for detecting and outputting critical timing events. Each canary circuit includes an adjustable delay element and an analyser circuit. The analyser circuit is configured for receiving the critical timing event output from at least one of the plurality of canary circuits for a predetermined time interval for each of a plurality of delay values of the adjustable delay element of the at least one canary circuit and determining a probability distribution of critical timing events of the at least one of the plurality of critical paths for the predetermined time interval for the plurality of delay values. Thereby, a critical timing event is triggered when the margin of the functional timing critical path reaches its lower limit.

This is also achieved, according to a second aspect of the present disclosure, by a dynamic voltage/frequency scaling system for dynamically adjusting the voltage and/or clock frequency for at least one functional circuit. The system includes at least one functional circuit having a plurality of critical paths, the apparatus according to the first aspect above, and a control module configured to control the voltage and/or clock frequency of the at least one functional circuit based upon a predetermined threshold derived from the probability distribution of critical timing events determined by the apparatus.

This is also achieved, according to a third aspect of the present disclosure, by a method for monitoring timing of a plurality of critical paths of a functional circuit. The method includes detecting critical timing events of at least one of the plurality critical path of a functional circuit, maintaining a count of the detected critical timing events for a predetermined time interval for a plurality of delays, and determining a probability distribution of the count of critical timing events of the at least one of the plurality of critical paths for the predetermined time interval for the plurality of delays.

This is also achieved, according to a fourth aspect of the present disclosure, by a method of dynamically controlling voltage/frequency scaling of the voltage and/or clock frequency for at least one functional circuit. The method includes monitoring critical timing events according to the method of third aspect above, detecting critical timing events of at least one of the plurality critical path of a functional circuit, deriving the number of critical timing events for a predetermined time interval of the at least one critical path, and controlling the voltage and/or clock frequency of the at least one functional circuit based upon the derived number of critical timing events with respect to a predetermined threshold defined by the probability distribution of critical timing events determined by the monitoring.

Determining a probability of failure by counting the critical timing events exploits dynamic on-chip variation, e.g., supply and temperature variation (externally or internally due to different processing) and clock jitter. This fuzzy measure allows very precise fine-tuning of the margin as opposed to a classical binary 1/0 feedback of canary circuits. As a result, more reliable detection of the extreme frequency-voltage combination of a chip is achieved before it actually fails, so the system is able to react appropriately to prevent the failure actually occurring. Moreover, the methodology can be easily integrated in the design flow and scalable across technologies.

In an embodiment, wherein the analyser circuit comprises a counter for counting critical timing events output by the at least one of the plurality of canary circuits for the predetermined time interval, a logic circuit can also be connected to the counter. In this example, the logic circuit is configured for determining the probability distribution of critical timing events of the at least one of the plurality of critical paths for the predetermined time interval by determining a cumulative density function of the count of critical timing events. Further, each of the plurality of canary circuits can include a canary register, a delay element coupled between the critical path and an input of the canary register (or a delay element in the clock line to the non-canary (functional) flip-flop), wherein the output of the canary register can indicate a critical timing event.

Consequently in-situ canary flip-flops are utilised, which feature a slightly higher delay time at their input. Hence, they fail before the timing critical paths.

Further, the circuit is designed such that it can be realised by automated integration. It can dynamically track the actual process, voltage and temperature as well as on-die variations, i.e. it is suitable for modern technologies and allows for operation at low power voltages.

The delay of the delay element may be adjustable. Therefore the delay can be selected in such a way to trigger sufficient signalling events to get statistical data, e.g., set sensitivity of monitoring by adjusting the trigger threshold of the apparatus. As a result the system is not limited to a single signalling event and therefore the system is not prone to statistical variations in occurrences of the most critical timing path.

Each of the plurality of canary circuits may be coupled to the input of a sequential functional element of the critical path, for example, the terminal register of a critical path. As a result, a simpler canary circuit can be realised with only the terminal register being duplicated whilst still providing valid results.

The apparatus may further comprise an enable/disable terminal for enabling or disabling any one of the plurality of canary circuits to minimize the impact on functional design in terms of power and noise coupling.

Each of the plurality of canary circuits may comprise a monitor register, which may be sticky enabled so as to store occurrence of a critical timing event. The analyser circuit may further comprise an identifier circuit for identifying from the monitor register in which critical path a critical timing event occurred so as to provide localised remedial action to resolve critical timing events.

The predetermined time interval is the time window over which the probability distribution is obtained and this may be variable in order to obtain the right trade-off between averaging of randomly distributed events and latency of the control loop.

BRIEF DESCRIPTION OF DRAWINGS

For a more complete understanding of the present disclosure, reference is now made to the following description taken in conjunction with the accompanying drawings in which.

DETAILED DESCRIPTION OF EMBODIMENTS OF THE DISCLOSURE

Figure 1:
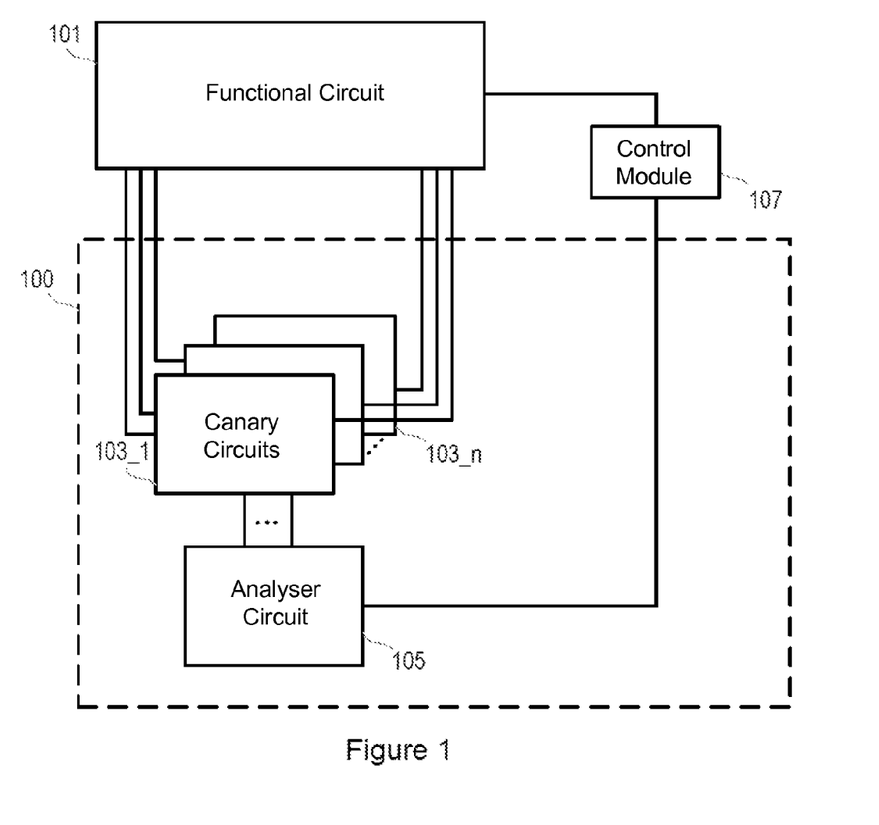
FIG. 1 is a simplified schematic of a circuit including apparatus for monitoring timing of a plurality of critical paths according to an embodiment of the present disclosure.
Figure 2A:
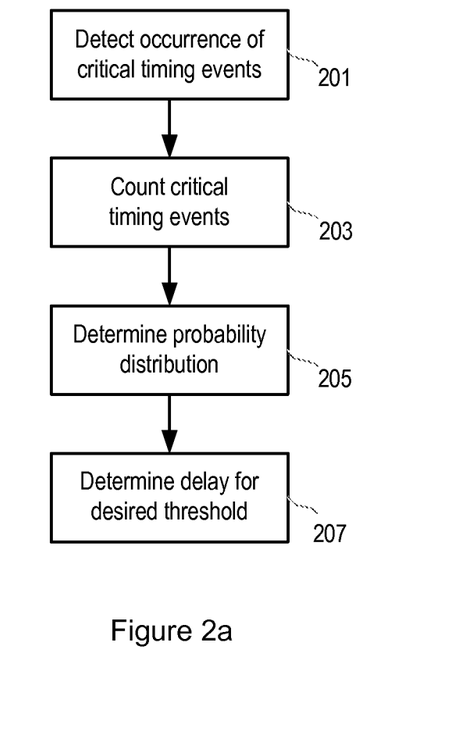
FIG. 2a is a flowchart of a method for monitoring timing of a plurality of critical paths according to an embodiment of the present disclosure.
Figure 2B:
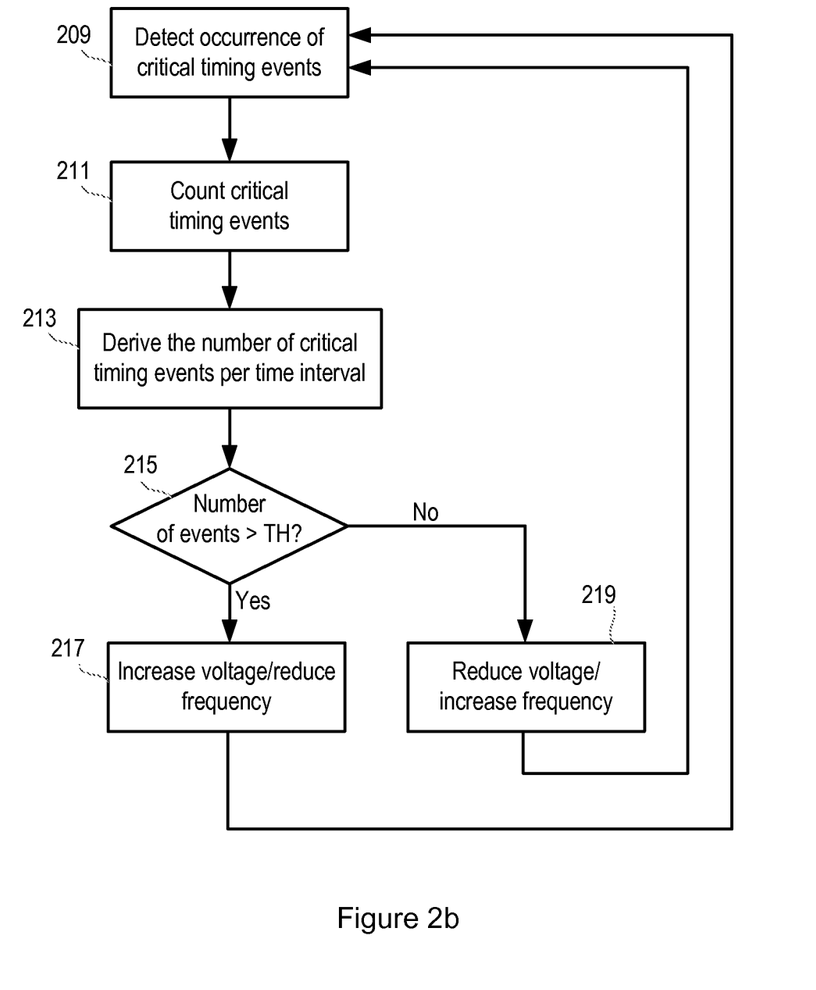
FIG. 2b is a flowchart of a method for dynamically controlling voltage/frequency scaling according to an embodiment of the present disclosure.

With reference to FIGS. 1, 2a and 2b, apparatus 100 for monitoring timing of a plurality of critical paths of a functional circuit 101 according to an embodiment of the present disclosure comprises a plurality of canary circuits 103_1 to 103_n, each coupled to a critical path of the functional circuit 101. Although FIG. 1 shows 3 canary circuits, it can be appreciated that any number of canary circuits may be utilised.

With reference to FIG. 2a, during the design phase of the functional circuit, each canary circuit 103_1 to 103_n detects critical timing events, step 201. The output of the canary circuits is connected to an analyser circuit 105 for receiving the critical timing event output from at least one of the plurality of canary circuits 103_1 to 103_n via simulation or static time analysis, described in more detail below, and for detecting, step 201, and maintaining a count, step 203, of the number of critical timing events that occur at each of a plurality of delay values for a predetermined time interval. These results are used to determine a probability distribution, step 205, as described in more detail below. The delay for the canary circuits is determined for a particular threshold value of the rate of occurrence of critical timing events in the predetermined time interval (the signalling rate), step 207, as described in more detail below.

During operation of the functional circuit, as shown in FIG. 2b, the delay of each canary circuit is set at the delay value determined by the method of FIG. 2a. Each canary circuit 103_1 to 103_n detects critical timing events, block 209. The analyser circuit 105 counts the critical timing events, step 211, and derives, step 213, the number of critical timing events (signalling rate) for a predetermined time interval. The output of the analyser circuit 105 is connected to a control module 107 for adjusting the voltage and/or frequency of the functional circuits 101. More particularly, if there is any increase in the signalling rate above the threshold TH (that is, % occurrence of critical timing events exceeds the threshold), step 215, the supply voltage is increased and/or the operating frequency reduced, step 217. However, if the signalling rate is below the threshold, step 215, the supply voltage is reduced and/or the operating frequency is increased, step 219.

Figure 3:
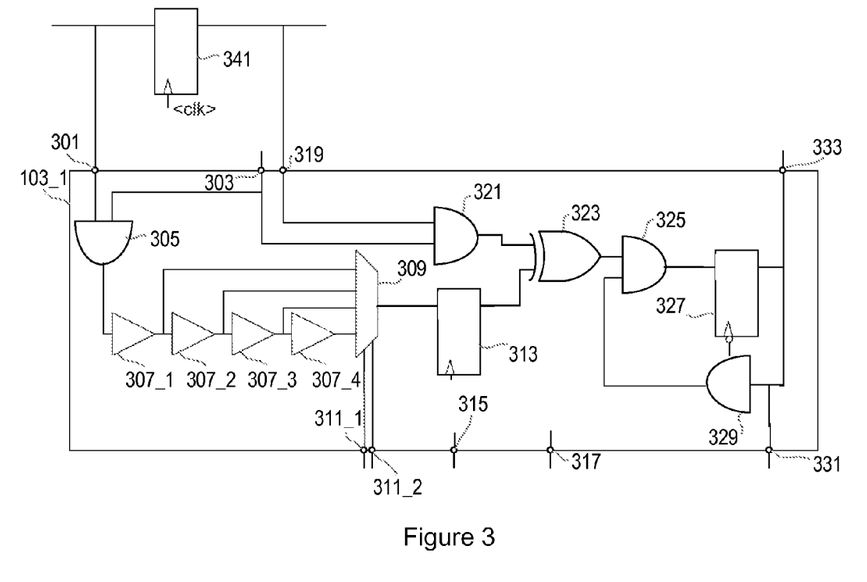
FIG. 3 is a simplified schematic of a canary circuit of the apparatus of FIG. 1.

The canary circuits 103_1 to 103_n may be substantially similar and an example of a canary circuit 103_1 is shown in FIG. 3.

The first input terminal 301 of the canary circuit 103_1 is connected to the input of a functional sequential element 341, for example a terminal register or flip-flop of a timing critical path of the functional circuits 101. A second input terminal 319 of the canary circuit 103_1 is connected to the output of the sequential element 341.

Although the embodiment described herein describes the monitoring of a flip-flop, it can be appreciated that this would be equally applicable to other types of sequential elements.

The first input terminal 301 of the canary circuit 103_1 is connected to a first input of an AND gate 305. The other input of the AND gate is connected to an enable terminal 303. The output of the AND gate 305 is connected to the input of a series of delay elements 307_1, 307_2, 307_3, 307_4. Each delay element provides a predetermined delay as a percentage of the clock period. Although 4 delay elements are shown here, it can be appreciated that any number of elements may be included as required. The output of each delay element is connected to a multiplexer 309 which is controlled via input on the plurality of delay_select terminals 311_1, 311_2. The output of the multiplexer 309 is connected to the input of a canary flip flop 313 which is reset via the reset terminal 315. The reset terminal 315 is used to synchronously reinitialize the flipflops, i.e. to disable the sticky state of the flipflops in the delay monitor (not shown in FIG. 3). The asynchronous reset terminal 317 allows for complete reset of the chip, i.e. all flipflops in the chip will be reset. This is usually done only once after enabling the chip.

The second input terminal 319 is connected an input of an AND gate 321. The other input of the AND gate 321 is connected to the enable terminal 303. The output of the AND gate 321 is connected to an input of an XOR gate 323. The other input of the XOR gate 323 is connected to the output of the canary flip-flop 313. The output of the XOR gate 323 is connected to an input of an OR gate 325. The other input of the OR gate 325 is connected to the output of an AND gate 329. The output of the OR gate is connected to the input of a monitor register (or flip-flop) 327. The output of the monitor register 327 is connected to an output terminal 333 of the canary circuit 103_1. The output of the monitor register 327 is also connected to an input of the AND gate 329. The other input of the AND gate 329 is connected to the sticky enable terminal 331.

Figure 4:
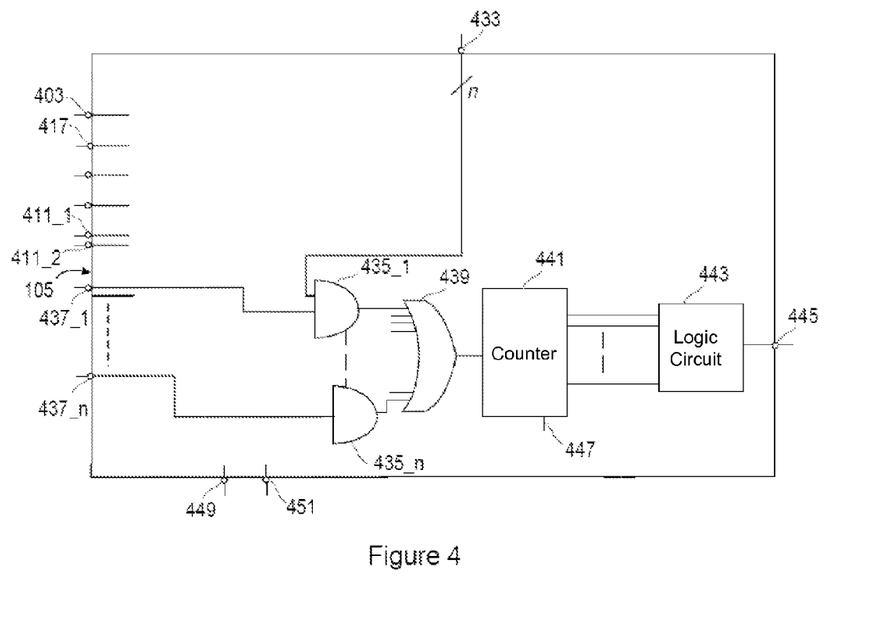
FIG. 4 is a simplified schematic of the analyser circuit of the apparatus of FIG. 1.

The output terminal 333 of the canary circuit 103_1 and of each canary circuit is connected to respective input terminals 433 of the analyser circuit 105 shown in more detail in FIG. 4.

Each input terminal 433 for each output of each canary circuit is connected to an input of a respective AND gate 435_1 to 435_n. The other input of each of the AND gate 435_1 to 435_n is connected to respective select input terminals 437_1 to 437_n specifying per delay monitor whether to count or not the occurred violations. The output of each AND gate 435_1 to 435_n is connected to a respective input of an OR gate 439. The output of the OR gate is connected to the input of a counter 441 which has a gated clock 447. The output of the counter is connected to a logic circuit 443, which includes an identifier circuit. The output of the logic circuit 443 is connected to an output terminal 445 of the analyser circuit 105 which is connected to the input of the control module 107.

Operation of the apparatus will be described with reference to FIGS. 1 to 6.

Figure 5:
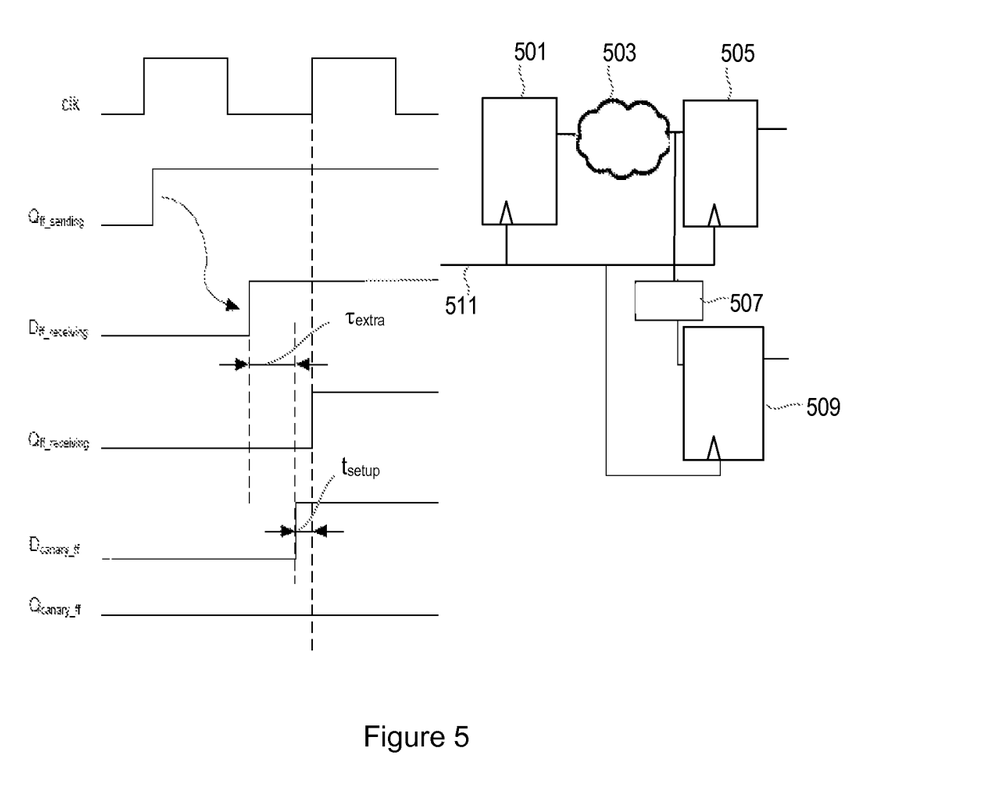
FIG. 5 is a timing diagram illustrating the detection of critical timing events of a timing critical path according to an embodiment of the present disclosure.

Each canary circuit 103_1 to 103_n is connected across the functional sequential element 341, for example, a terminal register (or flip-flop) 341 of a timing critical path of the functional circuit 101. The canary flip-flop 313 of each canary circuit 103_1 to 103_n is selected to be slightly more timing critical than the functional flip-flops 341 of the functional circuit 101. An extra delay is added between the input of the register 341 of the functional circuit 101 and the input of the canary flip-flop 313. The canary flip-flop 313 will fail earlier than the flip-flop 341 of the functional circuit 101. The behaviour of the canary flip-flop 313 compared to the functional flip-flop 341 is shown in FIG. 5. In this figure, the circuit is illustrated in a simple schematic in which the timing critical path is illustrated as a sending flip-flop 501 connected via combinational logic 503 to a receiving flip-flop 505. The sending and receiving flip-flops 501, 505 being commonly clocked 511 by the clock signal, clk. The path to the canary flip-flop 509 (also clocked by the common clock signal, clk) has extra delay 507 corresponding to delay elements 307_1 to 307_4, resulting in that a critical timing event will occur first on the canary flip-flop 509. This violation triggers the system (design) for a potential violation on the functional flip-flop 505.

Due to a timing violation in the timing critical path 501, 503, 505, the input of the receiving flip-flop 505, $D_{ff\_receiving}$ is received late as illustrated in the timing diagrams of FIG. 5. The extra delay 507, $\tau_{extra}$, introduced between the inputs of the receiving flip-flop 505 and the canary flip-flop 509 and due to the timing violation causes setup time, $t_{setup}$, to be too short and capture on the canary flip-flop, $Q_{canary\_ff}$, fails.

Figure 6:
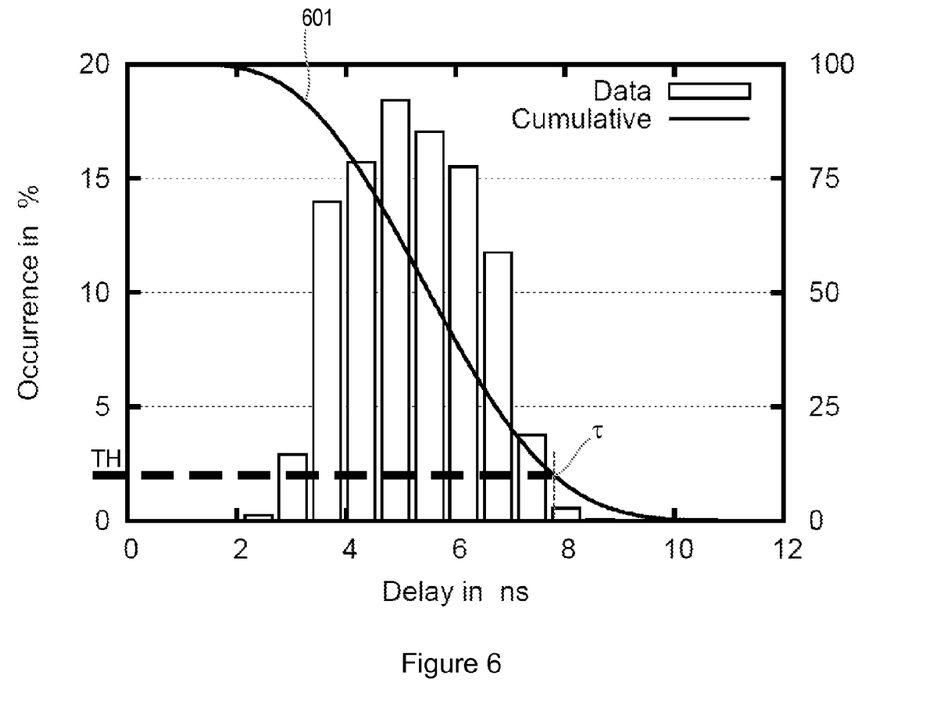
FIG. 6 is graphical representation of gathered statistical information of critical timing events of a critical path according to an embodiment of the present disclosure.

In the embodiment shown in FIG. 3, the output of the monitor register 327 is set such that '0' indicates no critical timing events and '1' indicates a critical timing event detected. These are collated and counted by the counter 441. The timing and value of the count is output to the logic circuit 443 where the cumulative density function of the count of critical timing events is derived to provide the probability distribution. An example of a plot of the determined probability distribution is illustrated in FIG. 6. The point of failure of the functional sequential element 341 is indicated at 605, the point of signalling of the canary sequential element 313 is the dashed line 603. The plotted distribution 601 clearly illustrated that a positive slack does not violate timing requirements and that a negative slack indicates a failing path.

The apparatus is enabled or disabled via the enable terminal 303 to minimize the impact on the (functional) design in terms of power and noise coupling.

The amount of extra delay $\tau_{extra}$ in the path to the canary flip-flop 313 is selectable by the select terminals 311_1, 311_2. For example, two, three, five or ten percent of the clock can be selected for the extra delay by switching in different numbers of delay elements 307_1 to 307_n as required via the multiplexer 309 which is controlled by the value input on the terminals 311_1, 311_2.

Although in this embodiment, the extra delay is implemented by multiplexing different numbers of delay elements, it can be appreciated that this may be implemented in a number of different ways, for example variable drive strengths, variable load, sequential chain of delay elements, voltage controlled delay and many other alternative implementations that would be appreciated by a person skilled in the art.

The monitor flip-flop 327 captures failure of the canary flip-flop 313. The monitor flip-flop 327 can be optionally sticky via the terminal 331, i.e. a single event permanently changes the signalling level until the monitor is reset (using terminal 315), i.e. the violation is stored within the monitor flip-flop 327. If the monitor flip-flop is not sticky then the number of failures on the canary flip-flop can be output and then counted. The stickiness is used to determine which path is actually failing in order to correlate the failing conditions within the simulation environment. Once set up, asynchronous signalling is used for control.

In combination, these features are very effective in capturing the actual margin. When changing, over time, the additional delay $\tau_{extra}$ in the datapath to the canary flip-flop 313 the circuitry effectively realizes a time-to-digital converter. The range and the granularity are only limited by the amount of hardware (i.e. delay elements) added. The observed timing has a desired dependency on the actual PVT conditions. However, it is also a function of the application running on the hardware. Depending on the number of critical paths being monitored, the actual worst-case timing path might only be triggered very rarely (1 s to 5 s for example), if at all. Hence, adapting the dynamically voltage and/or frequency based only on the timing critical path is very challenging as a binary failure bit output by traditional canary circuits might not be triggered in time. However, with asynchronous signalling of the failures a counter can gather statistical information on the failure probabilities (failures per time window) for various delay values.

During the design phase of the functional circuit 101, the signalling rate is simulated over a range of adjustable delays of the canary circuits 103_1 to 103_n. Alternatively, static timing analysis can be used for this. The simulation or analysis is conducted for all endpoints observed by the canary circuits. The simulation results are validated in silicon. Additionally, the values can be correlated across the PVT corners. This is carried out during the design phase of the function circuit 101. Additionally, the use of on-chip sensors allows tracking of PVT values across a specific die, which can be used to adapt the delay settings dynamically according to the data collected during bring-up. As suitable, a calibration can be run at specific time intervals and/or after reset to track aging. On-chip delay fault self-testing may be used for this.

An example of gathered statistical data is shown graphically in FIG. 6. The frequency of occurrences as shown in FIG. 6 resembles a Gaussian distribution as shown by the curve 601.

As opposed to triggering on the occurrence of a first critical timing event, the adjustable delay of the plurality of canary circuits 103_1 to 103_n is set such that it triggers at a predetermined threshold TH defined by the required cumulative trigger rate. For example, the required cumulative trigger rate may be 1%. As shown in FIG. 6, threshold TH of 1% occurs for a delay of 8 ns. The delay of the canary circuits 103_1 to 103_n is set at the determined delay (in the example of FIG. 6, $\tau_{extra}$=8 ns).

As the supply voltage and/or operating frequency are adjusted, steps 217, 219, the plot as shown in FIG. 6 shifts, horizontally, to the left or right so that the current delay value is maintained and the signalling rate as detected by the embodiment of the present disclosure is substantially equal to the threshold value such that if the signalling rate is below the threshold TH, the supply voltage and/or operating frequency is controlled to cause the plot to shift horizontally to the left and if the signalling rate is above the threshold TH, the supply voltage and/or operating frequency is controlled to cause the plot to shift horizontally to the right.

Figure 7:
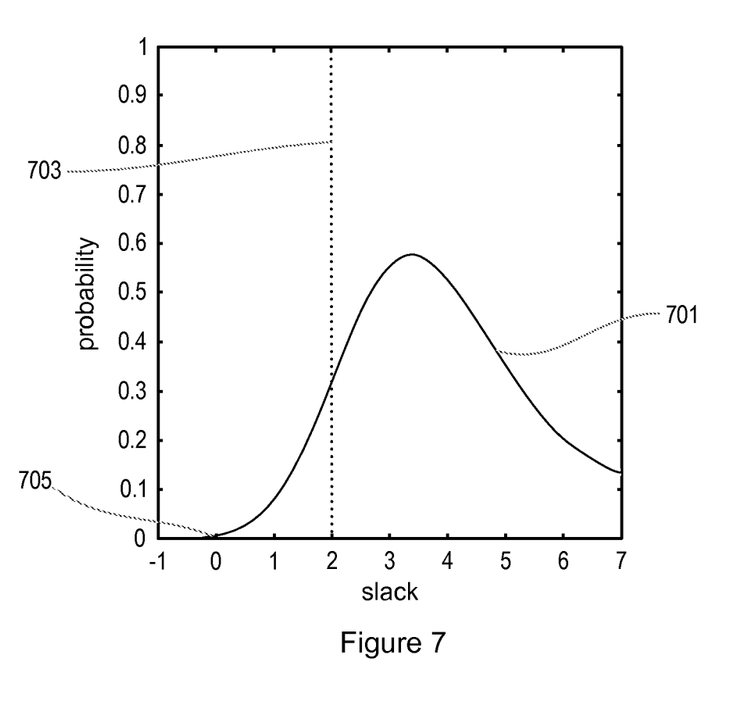
FIG. 7 is an example of a plot of an example of distribution of critical timing events of a critical path according to an embodiment of the present disclosure.

An example of a plot of the cumulative distribution of the probability of occurrence of a critical timing event for various time delays is shown in FIG. 7. The actual plot of FIG. 7 is the probability of occurrence of a critical timing event versus the slack (the path delay minus the clock cycle time). A path with a positive slack (i.e. slack value above zero) does not violate the timing requirements. A negative slack indicates a failing timing path. The number of paths from the sending sequential elements 501 to the receiving sequential element 505 determines the number of possible timing paths 2N. This assumes single input switching. Considering simultaneous switching, jitter and noise, a quasi continuous probability distribution can be derived as shown in FIG. 7. In this example, for a very small probability (i.e. close to zero) there might actually be a violating timing path (slack<0). As discussed above, it can be rather difficult to capture this path (in-time).

However, setting the delay of the canary flop in such a way that it signals violations of paths that have 2 time units (t.u.) of timing margin (i.e. 2 t.u. slack), we can observe this with a probability equivalent to the area below the curve 601 and left of the dotted line 703. This is the cumulative density function which corresponds to the probability with which critical timing events may occur. This probability is captured by counting the signalling events of e.g. one, few or all canary flops over a specific time period (predetermined time interval), depending on the selection defined by signals 437_1 to 437_n. The time interval can be selected as to provide the right trade-off between averaging of randomly distributed events and latency limit of the control loop.

In the case of change environmental conditions, the curve 701 will shift left when data delay is increased or right when data delay is decreased (not illustrated in FIG. 7). The height of the curve indicates the differential change in signalling events. Hence, a shift of the curve of dx by a time step dt will change the probability of signalling event by the area spanned by the curve over dt. This change will signal the control module 107 in FIG. 1 to change frequency and voltage such that correct operation of the functional circuit is guaranteed, i.e. until the undistorted situation (in terms of slack, i.e. number of signalling events) is reached.

In this way not only the most critical path can be observed but a specific number of most critical paths. The adjustable delay has to be set in such a way as to trigger sufficient signalling events to get statistical data.

In addition to systematic delay variations due to different input vector patterns also random variations like clock jitter or supply noise will impact the distribution. In this case, data is captured just around the clock edge. Hence, there is the risk of bi-stable states within the sequential element which has two issues. First, the power consumption is increased in elements that are driven with the intermediate voltage as the short-circuit power goes up. Although it is desirable to obtain statistical data, the probability of stimulating such a bi-stable state is low and will be resolved latest in the next clock cycle. Second, the logic state is unknown and will only be resolved to a random binary value in a following logic stage. If this process is random in nature, it will not impact the statistical data. If the bi-stable state is resolved with a bias, it only affects the tuning process when a correlation is determined between the number of signalling events and the failure of the most critical path.

At the input of the event counter the asynchronous signals (from the monitors) are synchronized to mitigate bi-stable state. Hence, the apparatus of the present disclosure is immune to issues of bi-stable states.

Based on the statistical data the voltage-frequency combination can be margined properly even for the worst-case path. The tuning can encompass different degrees of fine-tuning starting on a one-setting-fits-it-all level down to an energy optimal solution with minimal margin that considers factors such as application, supply settings, and random variation in silicon. In any case, it has to be assured that the margin covers fast changes in the environmental conditions e.g. changes in instruction and data flow causing a significant variation in the supply voltage for a substantially short time interval that cannot be tracked with this kind of monitor. Overall, the performance monitor is very well suited to control DVFS.

Based on the resulting probability distribution, the clock frequency and/or voltage of the functional circuit 101 can be modified to prevent critical timing events.

The apparatus of the present disclosure enables a fully automated design of a circuit to be developed since the number of canary circuits is specified by the user. An analyser with n canary circuits is then inserted into the RTL design. After logic synthesis of the RTL design, the n most critical timing paths between two flip-flops are selected. The receiving flip-flop of each selected critical path is automatically connected to a canary circuit 103_1. An incremental logic synthesis is then performed to incorporate the (timing) influence of the connected canary circuits. The logic synthesis process will not consider the paths to the canary flip-flops as these are marked as false paths).

In a first stage, the critical paths are validated based on actual silicon. During this phase the sticky behaviour of the Canary circuits is exploited. For each of the most critical paths, suitable delay ranges are determined (this can also be application specific). The delay monitor manager (DMM) is configured accordingly. Now the application can be started. The Canary circuits will be set, so that rare failure events are expected. These will not lead to functional failures. Once, the signalling is beyond a predetermined threshold either the supply voltage has to be increased or the frequency reduced. The system can also be set up to track aging over the chip's lifetime. During power-up or in predefined periods the die is set into a self-test mode stimulating the worst case timing paths and adapting the delay in the DMM as well as adjusting the trigger threshold.

Any canary circuit 103_1 to 103_n can be disabled by use of the enable terminal 303. The ability to disable/enable circuits 103_1 to 103_n minimizes the impact on the functional design in terms of power and noise coupling.

The monitor register 327 can be optionally sticky by use of the sticky enable terminal 331. If the monitor register is not sticky then the number of failures on the canary flip-flop 313 can be counted. The stickiness is used to determine which path is actually failing. Once set up, the asynchronous signalling is used for the control.

Although embodiments of the present disclosure have been illustrated in the accompanying drawings and described in the foregoing detailed description, it will be understood that the disclosure is not limited to the embodiments disclosed, but is capable of numerous modifications without departing from the scope of the disclosure as set out in the following claims.

The invention claimed is:

1. Apparatus for monitoring timing of a plurality of critical paths of a functional circuit, the apparatus comprising:
   a plurality of canary circuits, each configured to be coupled to a critical path of a functional circuit for detecting and outputting critical timing events, each canary circuit including an adjustable delay element having a plurality of delay values; and
   an analyser circuit configured to receive the critical timing event outputs from at least one of the plurality of canary circuits during a predetermined time interval, to count the critical timing events that occur at each of the plurality of delay values of at least one of the adjustable delay elements, and to determine a probability distribution of the counted critical timing events over the plurality of delay values.

2. The apparatus according to claim 1, wherein each of the plurality of canary circuits includes a canary register; wherein the adjustable delay element is coupled between the critical path and an input of the canary register; and wherein an output of the canary register indicates a critical timing event.

3. The apparatus according to claim 2, wherein each of the plurality of canary circuits are coupled to the input of a sequential functional element of the critical path.

4. The apparatus according to claim 3, wherein the sequential functional element comprises the terminal register of a critical path.

5. The apparatus according to claim 4, wherein the apparatus further comprises an enable/disable terminal for enabling or disabling any one of the plurality of canary circuits.

6. The apparatus according to claim 5, wherein each of the plurality of canary circuits comprises a monitor register for storing occurrence of a critical timing event.

7. The apparatus according to claim 6, wherein the analyser circuit includes a logic circuit that further includes an identifier circuit for identifying from the monitor register in which critical path a critical timing event occurred.

8. The apparatus according to claim 7, wherein the predetermined time interval is variable.

9. A dynamic voltage/frequency scaling system for dynamically adjusting the voltage and/or clock frequency for at least one functional circuit, the system comprising:
   at least one functional circuit including a plurality of critical paths;
   the apparatus according to claim 1, wherein the analyser circuit of the apparatus is further configured to derive the number of critical timing events for the predetermined time interval of the at least one critical path; and
   a control module configured to control the voltage and/or clock frequency of the at least one functional circuit based upon a predetermined threshold derived from the probability distribution of critical timing events determined by the apparatus.

10. The dynamic voltage/frequency scaling system according to claim 9, wherein the control module is further configured to increase the voltage and/or reduce the clock frequency if the count of critical timing events exceeds the predetermined threshold.

11. The dynamic voltage/frequency scaling system according to claim 10, wherein the control module is further configured to reduce the voltage and/or increase the clock frequency if the count of critical timing events is less than the predetermined threshold.

12. A method for monitoring timing of a plurality of critical paths of a functional circuit, the method comprising:
   detecting critical timing events of at least one of the plurality critical paths of a functional circuit;
   maintaining a count of the detected critical timing events for a predetermined time interval for a plurality of delays of the at least one critical path; and
   determining a probability distribution of the count of critical timing events of the at least one of the plurality of critical paths for the predetermined time interval for the plurality of delays.

13. The method according to claim 12, further comprising varying the predetermined time interval.

14. A method of dynamically controlling voltage/frequency scaling of a voltage and/or clock frequency for at least one functional circuit, the method comprising:
   monitoring critical timing events according to the method of claim 12;
   detecting critical timing events of at least one of the plurality of critical paths of a functional circuit;
   deriving the number of critical timing events for a predetermined time interval of the at least one critical path; and
   controlling the voltage and/or clock frequency of the at least one functional circuit based upon the derived number of critical timing events with respect to a predetermined threshold defined by the probability distribution of critical timing events determined by the monitoring.

15. The method according to claim 14, wherein controlling further includes:
   increasing the voltage and/or reducing the clock frequency if the count of critical timing events exceeds the predetermined threshold; and
   reducing the voltage and/or increasing the clock frequency if the count of critical timing events is less than the predetermined threshold.

* * * * *